(12) United States Patent
Wilson et al.

(10) Patent No.: US 10,543,898 B2
(45) Date of Patent: Jan. 28, 2020

(54) DUAL-PURPOSE LOCKING AND FOLDING ARRANGEMENT FOR AN AIRCRAFT WING TIP DEVICE

(71) Applicant: Airbus Operations Limited, Bristol (GB)

(72) Inventors: Fraser Wilson, Bristol (GB); Robert Ian Thompson, Bristol (GB)

(73) Assignee: Airbus Operations Limited, Bristol (GB)

( * ) Notice: Subject to any disclaimer, the term of this patent is extended or adjusted under 35 U.S.C. 154(b) by 563 days.

(21) Appl. No.: 15/364,531

(22) Filed: Nov. 30, 2016

(65) Prior Publication Data

US 2017/0152015 A1 Jun. 1, 2017

(30) Foreign Application Priority Data

Nov. 30, 2015 (GB) .................................. 1521091 .7

(51) Int. Cl.
*B64C 3/56* (2006.01)
*B64C 23/06* (2006.01)

(52) U.S. Cl.
CPC .............. *B64C 3/56* (2013.01); *B64C 23/072* (2017.05); *F15B 2211/7055* (2013.01)

(58) Field of Classification Search
CPC ....... B64C 3/56; B64C 23/072; F15B 11/205; F15B 15/1404; F15B 15/1409;

(Continued)

(56) References Cited

U.S. PATENT DOCUMENTS 2,719,682 A 10/1955 Handel
5,381,986 A 1/1995 Smith et al.
(Continued)

FOREIGN PATENT DOCUMENTS

EP 0 1870 519 5/1986
EP 1 350 960 10/2003
(Continued)

OTHER PUBLICATIONS

European Search Report cited in EP 16 19 8944, completed Apr. 27, 2017, two pages.

(Continued)

*Primary Examiner* — Rodney A Bonnette
(74) *Attorney, Agent, or Firm* — Nixon & Vanderhye P.C.

(57) ABSTRACT

An aircraft (5) including a wing (7) having a wing tip device (1) configurable between: a flight configuration and a ground configuration in which the span of the wing (7) is reduced. The aircraft (5) further includes a lock (13) for locking the wing tip device (1) in the flight configuration, and an actuator (3) for unlocking the lock (13) and for subsequently actuating the wing tip device (1) to the ground configuration. The actuator (3) is a two-stage hydraulic actuator, including a first hydraulic actuator stage (21) arranged to unlock the lock and a second hydraulic actuator stage (23) arranged to actuate the wing tip device (1) to the ground configuration. The first and second hydraulic actuator stages (21, 23) are arranged in series such that the second actuator stage (23) is unable to receive a hydraulic input feed until the first actuator stage (21) unlocks the lock (13).

13 Claims, 18 Drawing Sheets

(58) Field of Classification Search
CPC .............. F15B 15/1428; F15B 15/1447; F15B 2211/40; F15B 2211/7055
See application file for complete search history.

(56) References Cited

U.S. PATENT DOCUMENTS

| | | |
|---|---|---|
| 6,260,799 B1 | 7/2001 | Russ |
| 2014/0014768 A1 | 1/2014 | Lassen et al. |
| 2014/0319268 A1* | 10/2014 | Lassen ...................... B64C 3/56 244/49 |
| 2015/0014478 A1 | 1/2015 | Lassen et al. |
| 2015/0097087 A1 | 4/2015 | Sakurai et al. |
| 2016/0090170 A1* | 3/2016 | Thompson ......... B64D 45/0005 701/3 |
| 2016/0251075 A1* | 9/2016 | Thompson ................ B64C 3/56 244/198 |

FOREIGN PATENT DOCUMENTS

| | | |
|---|---|---|
| EP | 3018053 | 5/2016 |
| EP | 3 059 159 | 8/2016 |
| GB | 635259 | 4/1950 |
| GB | 686646 | 1/1953 |

OTHER PUBLICATIONS

Examination Report cited in GB1521091.7 dated Jul. 4, 2016, three pages.
Examination Report cited in GB1521091.7 dated May 19, 2016, eight pages.

\* cited by examiner

DUAL-PURPOSE LOCKING AND FOLDING ARRANGEMENT FOR AN AIRCRAFT WING TIP DEVICE

CROSS RELATED APPLICATION

This application claims priority to Great Britain patent application 1521091.7 filed Nov. 30, 2015, the entirety of which is incorporated by reference.

BACKGROUND OF THE INVENTION

There is a trend towards increasingly large passenger aircraft, for which it is desirable to have correspondingly large wing spans. However, the maximum aircraft span is effectively limited by airport operating rules which govern various clearances required when manoeuvring around the airport (such as the span and/or ground clearance required for gate entry and safe taxiway usage).

To address this problem, aircraft having so-called folding wing tips have been suggested. For example, a previously-suggested arrangement comprises an aircraft having a wing tip device that may be configurable between: (i) a flight configuration for use during flight, and (ii) a ground configuration for use during ground-based operations. In the ground configuration, the wing tip device is moved away from the flight configuration such that the span of the aircraft wing is reduced. The aircraft typically comprises an actuator for moving the wing tip device between the flight and ground configurations. That actuator may need to be of a relatively high capacity (especially in an arrangement in which the wing tip device is hinged to the tip of a fixed wing as the actuator may have a relatively low mechanical advantage when initially actuating the wing tip device).

For safety reasons, aircraft also typically comprise a locking system for locking the wing tip device in the flight configuration. In principle, an independent locking/unlocking mechanism may be provided. However, it is more desirable to have an arrangement in which the locking system is functionally linked to the wing tip actuator, such that the wing tip device is prevented from being actuated to the ground configuration, unless or until the wing tip device is unlocked.

SUMMARY OF THE INVENTION

There is provided an aircraft comprising a wing, the wing having a wing tip device at the tip thereof, wherein the wing tip device is configurable between: (i) a flight configuration for use during flight, and (ii) a ground configuration for use during ground-based operations, in which ground configuration the wing tip device is moved away from the flight configuration such that the span of the wing is reduced. The aircraft further comprises a lock for locking the wing tip device in the flight configuration, and an actuator for unlocking the lock and for subsequently actuating the wing tip device from the flight configuration to the ground configuration. The actuator is a two-stage hydraulic actuator, comprising a first hydraulic actuator stage arranged to unlock the lock and a second hydraulic actuator stage arranged to actuate the wing tip device from the flight configuration to the ground configuration, the first and second hydraulic actuator stages being arranged in series such that the second actuator stage is unable to receive a hydraulic input feed until the first actuator stage has been actuated to unlock the lock. Providing a two-stage actuator with first and second stages arranged in series, ensures that the wing tip device cannot be actuated until the lock has been unlocked. Thus, embodiments of the invention ensure the unlocking and movement of the wing tip device are carried out in the correct sequence.

The first actuator stage may comprise a first hydraulic chamber, an inlet port and an outlet port, and a piston in the first hydraulic chamber, and the second actuator stage comprises a second hydraulic chamber, an inlet port connected to the outlet port of the first actuator stage, and a piston in the second hydraulic chamber. The two-stage actuator may be arranged such that hydraulic fluid is only able to flow through the outlet port of the first actuator stage to the input port of the second actuator stage, once the first actuator stage has unlocked the lock. Preventing the flow of hydraulic fluid into the second actuator stage until the first actuator stage has completed unlocking the lock has been found to be an effective and reliable way of ensuring the correct actuation sequence. The outlet port of the first actuator stage may be only exposed once the piston in the first hydraulic chamber has reached its position associated with the unlocking of the lock (for example at, or towards, one end of the chamber).

The first actuator stage may comprise a restrictor arranged to control flow of hydraulic fluid into the chamber. By providing a restrictor arranged to control flow of hydraulic fluid into the chamber of the first actuator stage, the movement of the first actuator stage to unlock the lock can be controlled. The restrictor may be associated with the input port of the first actuator stage, and the first actuator stage may further comprise a bypass input port arranged to bypass the first input port, once the first actuator stage has unlocked the lock. By providing such a bypass input port, the two-stage actuator may be arranged to provide a controlled movement of the first actuator stage (using the restrictor) but then arranged to automatically actuate the second actuator stage as fluid can be supplied via the bypass port (bypassing the restrictor).

The piston in the first actuator stage may have a first hydraulic area on which the hydraulic fluid acts, and the piston in the second actuator stage may have a second hydraulic area on which the hydraulic fluid acts. The first hydraulic area may be smaller than the second hydraulic area, such that second actuator stage is arranged to exert a greater actuation force than the first actuator stage. By making the respective hydraulic areas different, the stages of the two-stage actuator can be arranged to exert different actuation forces under the same pressure of hydraulic fluid.

The wing tip device may be rotatable about a hinge. The wing tip device may be rotatable (about the hinge) in an upward direction, when moving from the flight configuration to the ground configuration. The wing tip device may generate a static (i.e. 1 g) bending moment about the hinge. The wing tip device may be moveable between the flight and ground configurations about a hinge and in the flight configuration the wing tip device may generate a static bending moment about the hinge, and the first actuator stage may be arranged to at least partially relieve the static bending moment, prior to unlocking the lock. At least partially relieving the static bending moment, prior to unlocking the lock, may enable the lock to be more readily unlocked.

The static bending moment may act to keep the lock locked. The first actuator stage may be arranged to sufficiently relieve the static bending moment that the wing tip device can be unlocked. The lock may comprise a pin received in a hole, and in the locked flight configuration the static bending moment may generate a shear load across the pin. The first actuator stage may be arranged to sufficiently relieve the static bending moment such that the shear load on the pin is reduced so that it can be withdrawn from the hole to unlock the lock.

The wing tip device may be a wing tip extension; for example, the wing tip device may be a planar tip extension. In other embodiments, the wing tip device may comprise, or consist of, a non-planar device, such as a winglet. In the flight configuration, the trailing edge of the wing tip device may be a continuation of the trailing edge of an inner wing. The leading edge of the wing tip device may be a continuation of the leading edge of the inner wing. There may be a smooth transition from the inner wing to the wing tip device. It will be appreciated that there may be a smooth transition, even where there are changes in sweep or twist at the junction between the inner wing and wing tip device. However, there may be no discontinuities at the junction between the inner wing and wing tip device. The upper and the lower surfaces of the wing tip device may be continuations of the upper and lower surfaces of the inner wing.

In the flight configuration, the span may exceed an airport compatibility gate limit. In the ground configuration, the span may be reduced such that the span (with the wing tip device in the ground configuration) is less than, or substantially equal to, the airport compatibility gate limit.

When the wing tip device is in the ground configuration, the aircraft incorporating the wing, may be unsuitable for flight. For example, the wing tip device may be aerodynamically and/or structurally unsuitable for flight in the ground configuration. The aircraft may be configured such that, during flight, the wing tip device is not moveable to the ground configuration. The aircraft may comprise a sensor for sensing when the aircraft is in flight. When the sensor senses that the aircraft is in flight, a control system may be arranged to disable the possibility of moving the wing tip device to the ground configuration.

The aircraft may be a passenger aircraft. The passenger aircraft may comprise a passenger cabin comprising a plurality of rows and columns of seat units for accommodating a multiplicity of passengers. The aircraft may have a capacity of at least 20, at least 50 passengers, or more than 50 passengers. The aircraft may be a powered aircraft. The aircraft may comprise an engine for propelling the aircraft. The aircraft may comprise wing-mounted engines, such as underwing mounted engines.

The first aspect of the invention may seek to ensure the correct sequence of movement for unlocking and moving (folding) the wingtip. A second aspect of the invention may seek to ensure the correct reverse sequence of movement for moving (unfolding) the wingtip and then locking it in the flight configuration. According to the second aspect of the invention, there is provided an aircraft comprising a wing, the wing having a wing tip device at the tip thereof, wherein the wing tip device is configurable between: (i) a flight configuration for use during flight and (ii) a ground configuration for use during ground-based operations, in which ground configuration the wing tip device is moved away from the flight configuration such that the span of the wing is reduced, the aircraft further comprising a lock for locking the wing tip device in the flight configuration, and an actuator for actuating the wing tip device from the ground configuration to the flight configuration, and for subsequently locking the lock, wherein the actuator is a two-stage hydraulic actuator, comprising a first hydraulic actuator stage arranged to lock the lock and a second hydraulic actuator stage arranged to actuate the wing tip device from the ground configuration to the flight configuration, the first and second hydraulic actuator stages being arranged in series such that the first actuator stage is unable to receive a hydraulic input feed until the second actuator stage has been actuated to move the wing tip device to the ground configuration.

Providing a two-stage actuator with first and second stages arranged in series, ensures that the wing tip device is locked in the flight configuration after it has been actuated to that configuration. Thus, embodiments of the invention ensure the movement and locking of the wing tip device are carried out in the correct sequence.

The first actuator stage may comprise a first hydraulic chamber, a piston in the chamber, and an inlet port. The second actuator stage may comprise a second hydraulic chamber, a piston in the chamber, an inlet port, and an outlet port connected to the inlet port of the first actuator. The two-stage actuator may be arranged such that hydraulic fluid only flows through the outlet port of the second actuator stage to the input port of the first actuator stage, once the second actuator stage has moved the wing tip device to the flight configuration. Preventing the flow of hydraulic fluid into the first actuator stage until the second actuator stage has completed moving the wing tip device has been found to be an effective and reliable way of ensuring the correct actuation sequence. The outlet port of the second actuator stage may be only exposed once the piston in the second hydraulic chamber has reached its position associated with the wing tip device being in the flight configuration (for example at, or towards, one end of the chamber).

It will be appreciated that the designation of the input and output ports of the first and second actuator stages may depend on the direction of movement of the actuator. For example, what is an input port in the first aspect of the invention, may equally be an output port in the second aspect of the invention and vice versa.

The outlet port of the second actuator stage may comprise a restrictor for controlling flow to the input port of the first actuator stage. By providing such a restrictor, the movement of the first actuator stage can be controlled, for example to ensure the lock is locked only when the movement of the wing tip device to the flight configuration is definitely complete.

There is provided an aircraft wing for use as the wing on the aircraft as described herein.

There is provided a two-stage actuator for use as the actuator described herein. The two-stage actuator comprises a first hydraulic actuator stage for unlocking a lock and a second hydraulic actuator stage arranged to actuate a wing tip device from a flight configuration to a ground configuration, the first and second hydraulic actuator stages being arranged in series such that the second actuator stage is unable to receive a hydraulic input feed until the first actuator stage has been actuated to unlock the lock.

There is provided a method of unlocking a wing tip device and for moving the wing tip device from a flight configuration for use during flight to a ground configuration for use during ground-based operations, in which ground configuration the wing tip device is moved away from the flight configuration such that the span of the wing is reduced, wherein the method comprises the steps of (i) supplying hydraulic pressure to a first actuator stage such that the first actuator stage unlocks a lock that had been locking the wing tip device in the flight configuration, (ii) subsequently supplying hydraulic pressure, through the first actuator stage, to a second actuator stage that is arranged in series with the first actuator stage, such that the second actuator stage moves the wing tip device from the flight configuration to the ground configuration.

There is provided a method of moving a wing tip device from a ground configuration for use during ground-based operations, to a flight configuration for use during flight, in which flight configuration the wing tip device is moved away from the ground configuration such that the span of the wing is increased, wherein the method comprises the steps of (i) supplying hydraulic pressure to a second actuator stage such that the second actuator stage moves the wing tip device from the ground configuration to the flight configuration, (ii) subsequently supplying hydraulic pressure, through the second actuator stage, to a first actuator stage that is arranged in series with the second actuator stage, such that the first actuator stage locks a lock to lock the wing tip device in the flight configuration.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
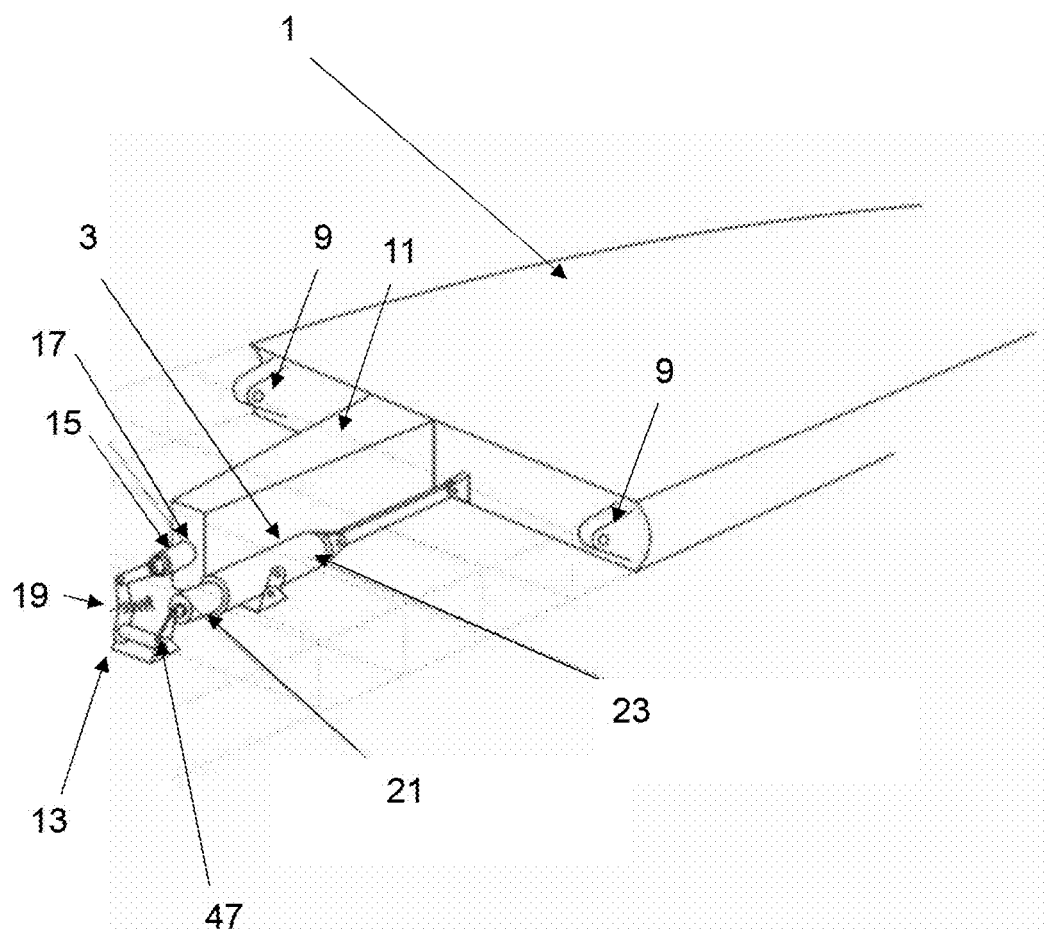
FIG. 1 shows a wing tip device and two-stage actuator on an aircraft according to a first embodiment of the invention.
Figure 2:
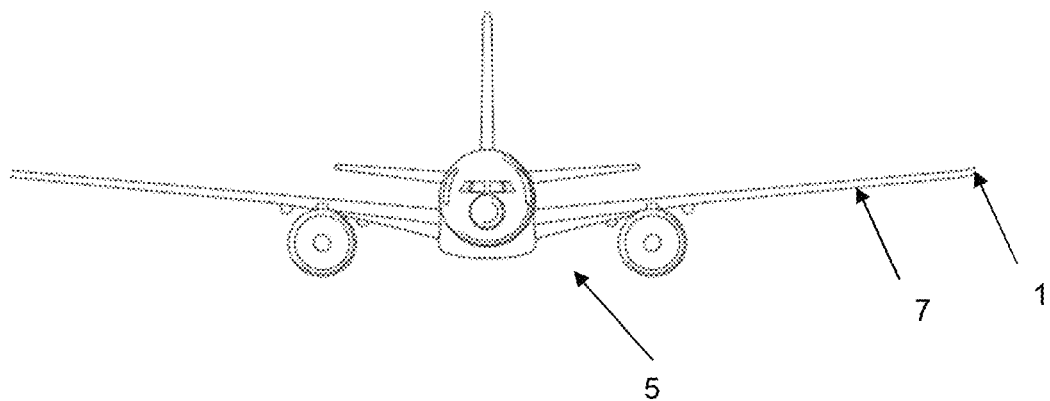
FIG. 2 shows the aircraft of the first embodiment of the invention.

FIG. 1 shows a wing tip device 1 and two-stage actuator 3 for use on an aircraft 5 according to a first embodiment of the invention. The aircraft 5 is shown in FIG. 2, but for clarity, only the wing tip device 1 and actuator 3 are shown in FIG. 1.

The wing tip device 1 is a planar wing tip extension, which is mounted to the tip of a fixed aircraft wing 7 via a hinge 9 (only the lugs of the hinge are shown in FIG. 1). The wing tip device 1 is configurable from a flight configuration in which the wing tip device 1 is an extension of the fixed wing 7 (i.e. as shown in FIGS. 1 and 2), to a ground configuration (not shown) in which the wing tip device 1 is pivoted upwardly about the hinge 9. The upward folding of the wing tip device 1 enables the span of the aircraft to be reduced, to meet airport gate limits for example.

The wing tip device 1 comprises a stub spar 11 which extends inboard of the hinge 9. At the inboard end of the stub spar 11 is a locking mechanism 13. The locking mechanism 13 comprises a pin 15 inserted into a hole 17 in the end of the stub spar 11. The pin 15 is held in place by a sprung over-centre lock 19. By virtue of the pin being held in the hole 17, the lock mechanism 13 locks the wing tip device 1 in the flight configuration.

The two-stage hydraulic actuator 3 is arranged to both lock/unlock the lock mechanism 13, and move the wing tip device 1 between the flight and ground configurations. The actuator 3 comprises a first hydraulic actuator stage 21 and a second hydraulic actuator stage 23. The first actuator stage 21 acts to perform the locking/unlocking of the lock mechanism 13, whereas the second actuator stage 23 acts to perform the movement of the wing tip device 1 between the flight and ground configurations.

Figure 3A:
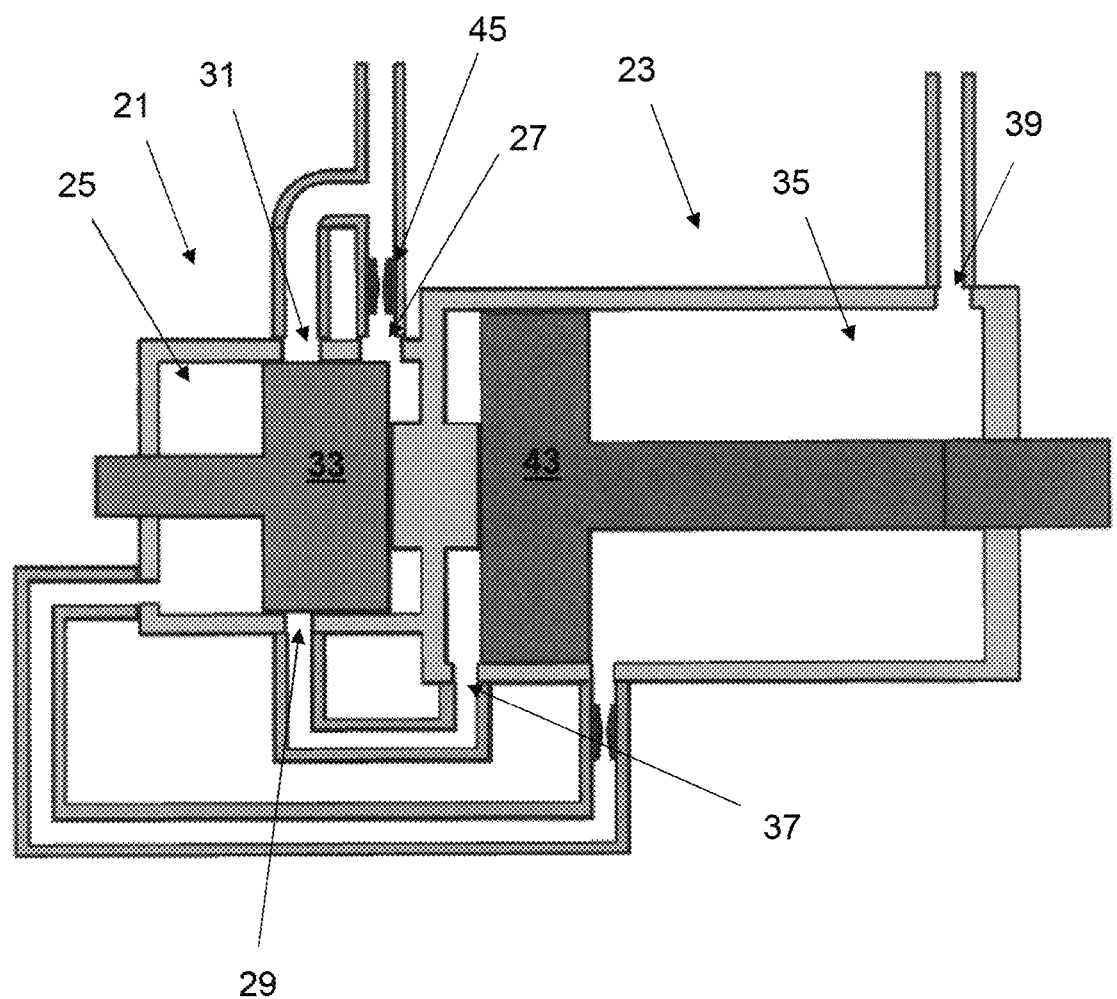
FIGS. 3a to 3g are schematic views of the two-stage actuator of FIG. 1, during the unlocking and folding of the wing tip device.
Figure 3B:
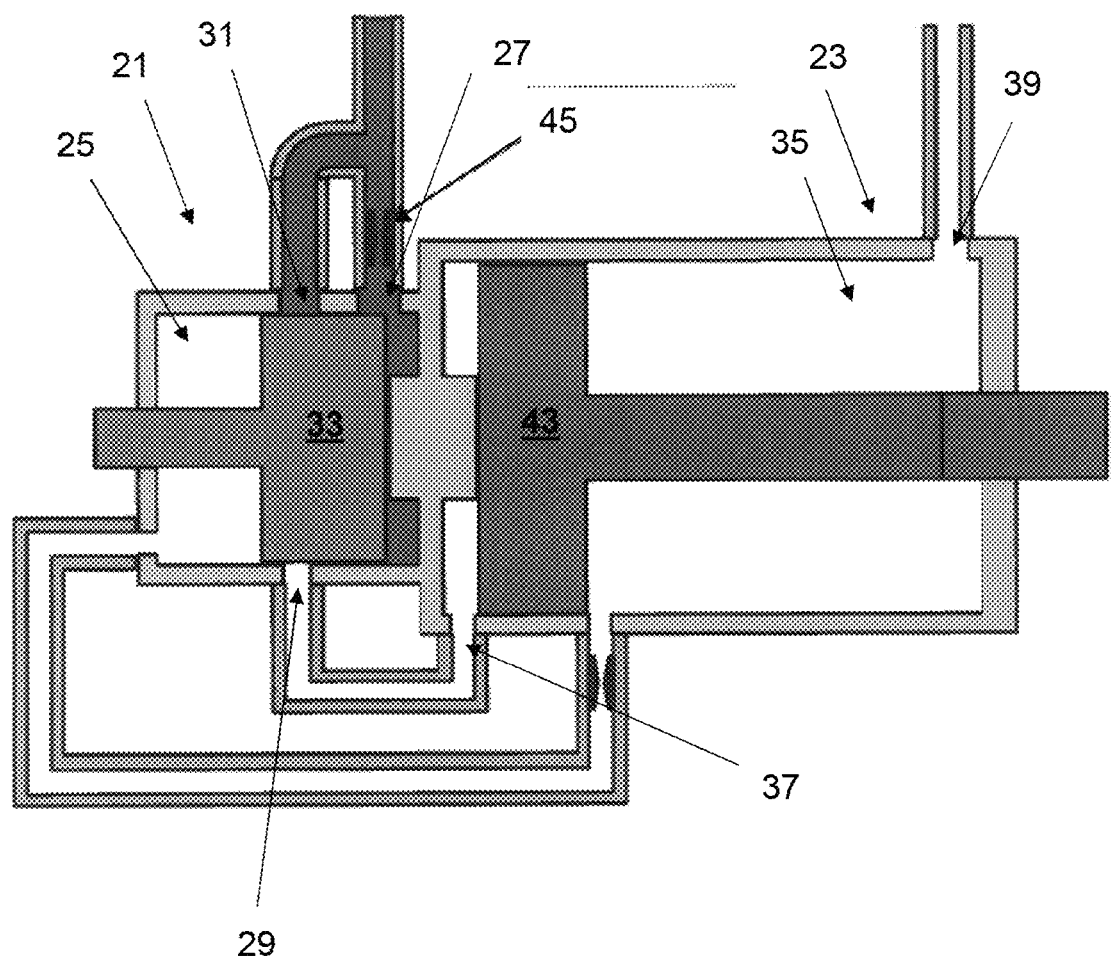
Figure 3C:
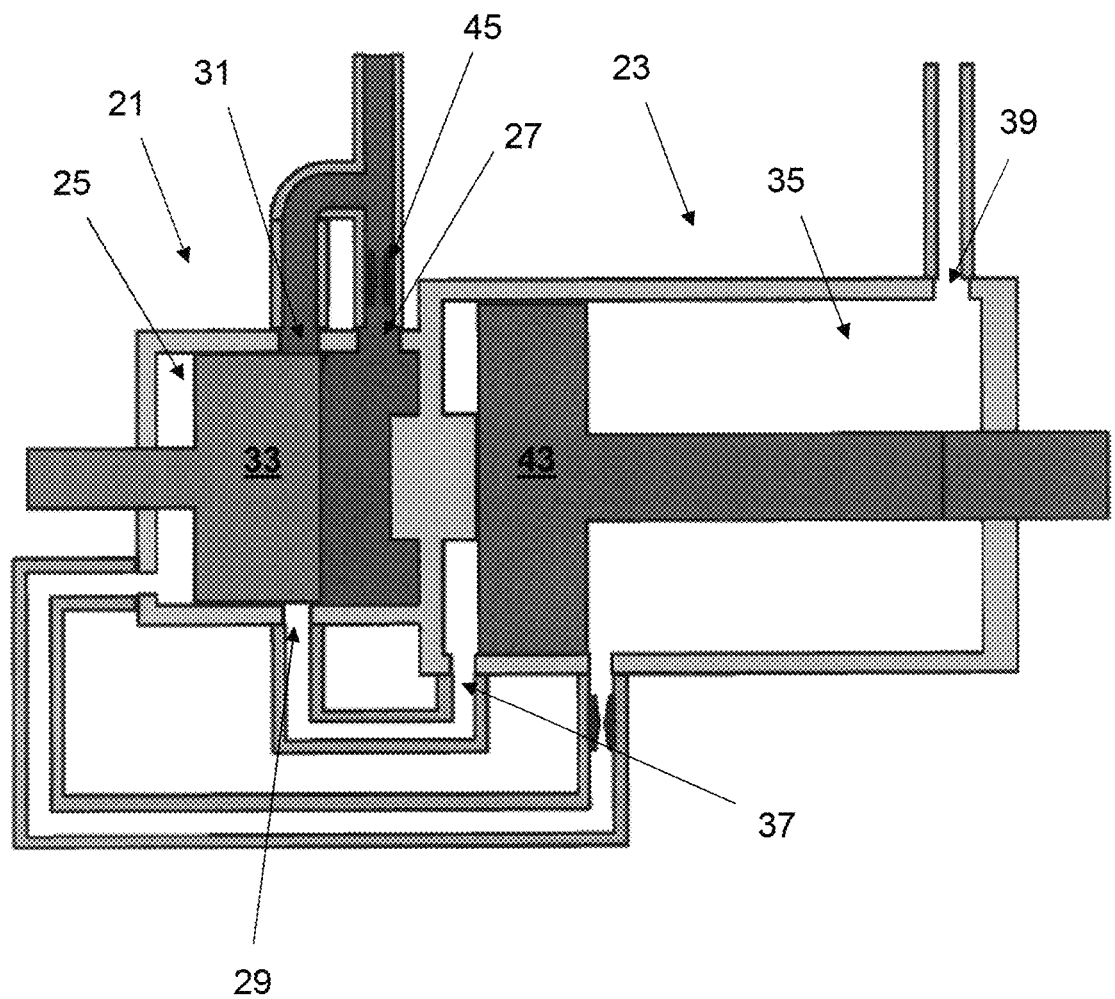

The two-stage actuator 3 will now be described in more detail with reference to FIGS. 3a to 3g:

FIG. 3a is a schematic section view of the two-stage actuator 3 of FIG. 1. The first actuator stage 21 comprises a circular cylindrical chamber 25 having an inlet port 27, and outlet port 29 and a bypass port 31. A piston 33 is slideably moveable in the chamber 25. The second actuator stage 23 comprises a larger diameter circular cylindrical chamber 35 having an inlet port 37, and outlet port 39. A piston 43 is slideably moveable in the chamber 35.

FIG. 3a shows the actuator 13 when the wing tip device 1 is locked in the flight configuration. When the wing tip device is to be moved to the ground configuration, hydraulic fluid is supplied to the chamber via the input port 27 (see FIG. 3b). This fluid flow is controlled by a restrictor 45. At this stage, there is no outlet for the fluid, so as the hydraulic fluid is supplied, the piston 33 moves towards the other end of the chamber 25.

The initial application of hydraulic fluid via the inlet port, urges the wing tip device to rotate around the hinge 9. The area of the piston 33 is such that the first actuator stage is able to relieve most of the static (1 g) bending moment caused by the weight of the wing tip device 1, but in unable to actually rotate the wing tip device 1 away from this position. Instead, the subsequent movement of the piston 33 pushes on the crank arrangement 47 (see FIG. 1) to withdraw the pin 15 from the hole 17. That withdrawal of the pin 15 is facilitated by the bending moment having been reduced because there is only a minimal shear load across the pin 15 when it is extracted. When the pin 15 is withdrawn from the hole 17 the locking mechanism is unlocked. This occurs when the piston 33 in the first actuator stage 21 has moved to the far end of the chamber 25.

Figure 3D:
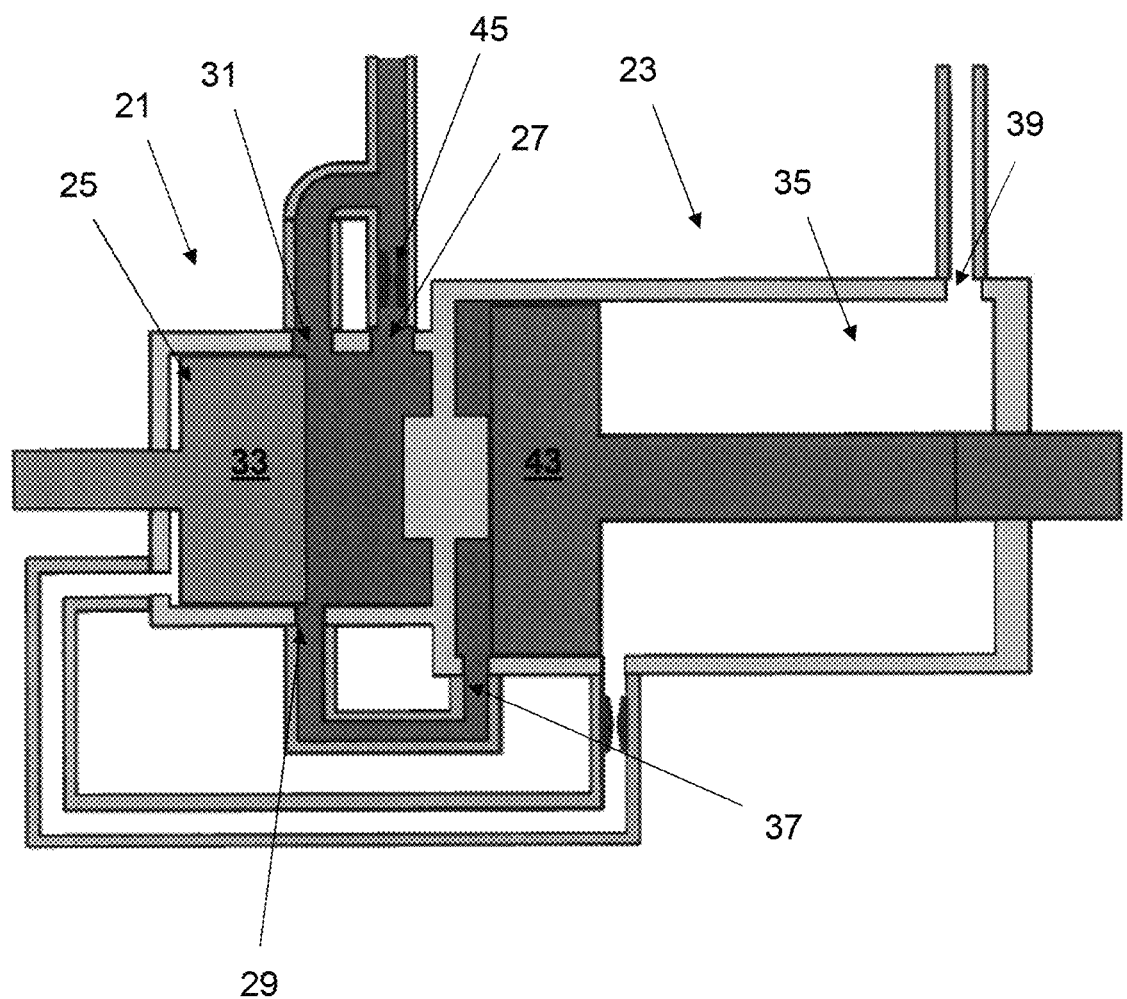

Referring now to FIG. 3d (which shows the actuator once the lock has been unlocked), once the piston 33 has moved to the far end of the chamber 25 the outlet port 29 is exposed, allowing the hydraulic fluid to travel to the inlet port 37 of the second actuator stage 23. The bypass port 31 in the first actuator stage 21 is also exposed, thereby bypassing the restrictor 45 and allowing unrestricted flow of hydraulic fluid.

Figure 3E:
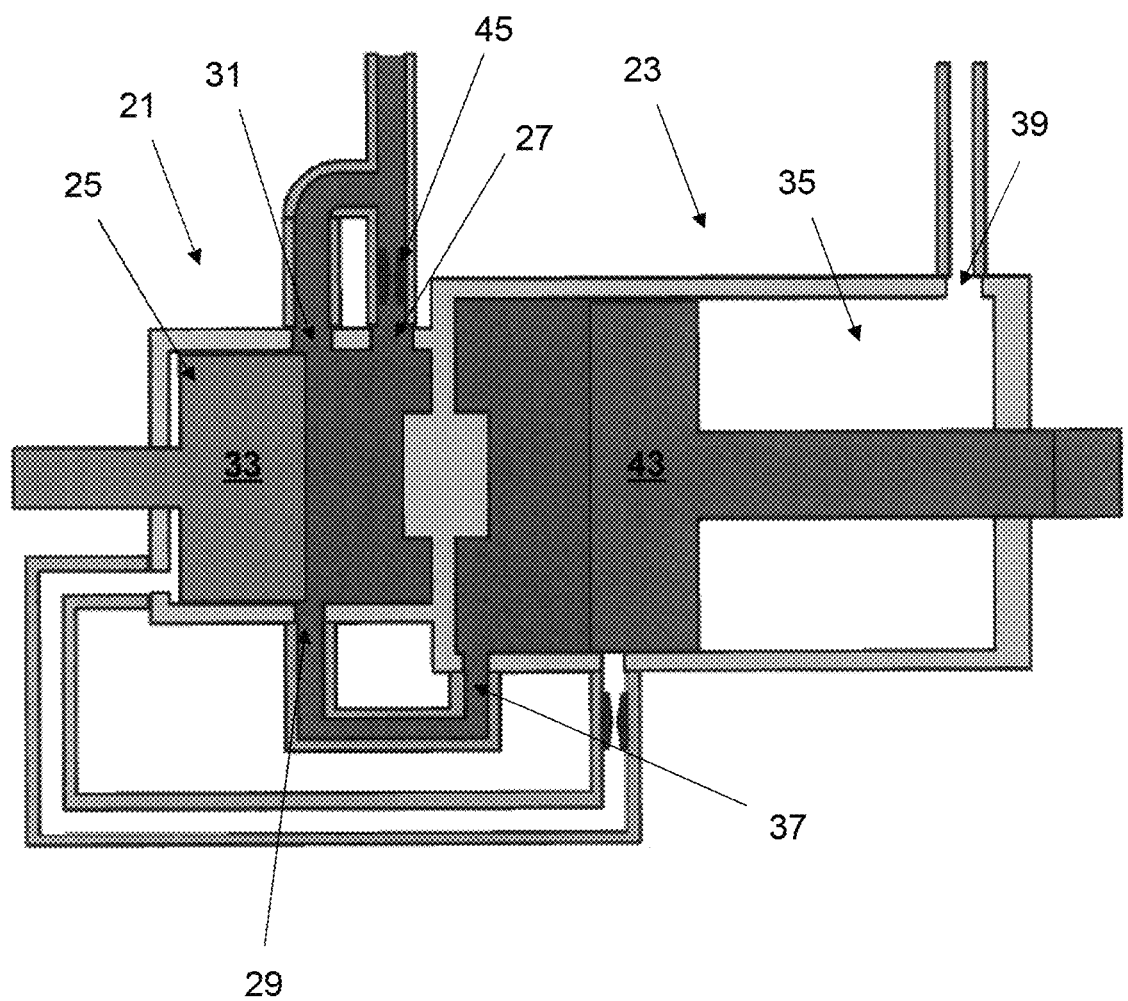
Figure 3F:
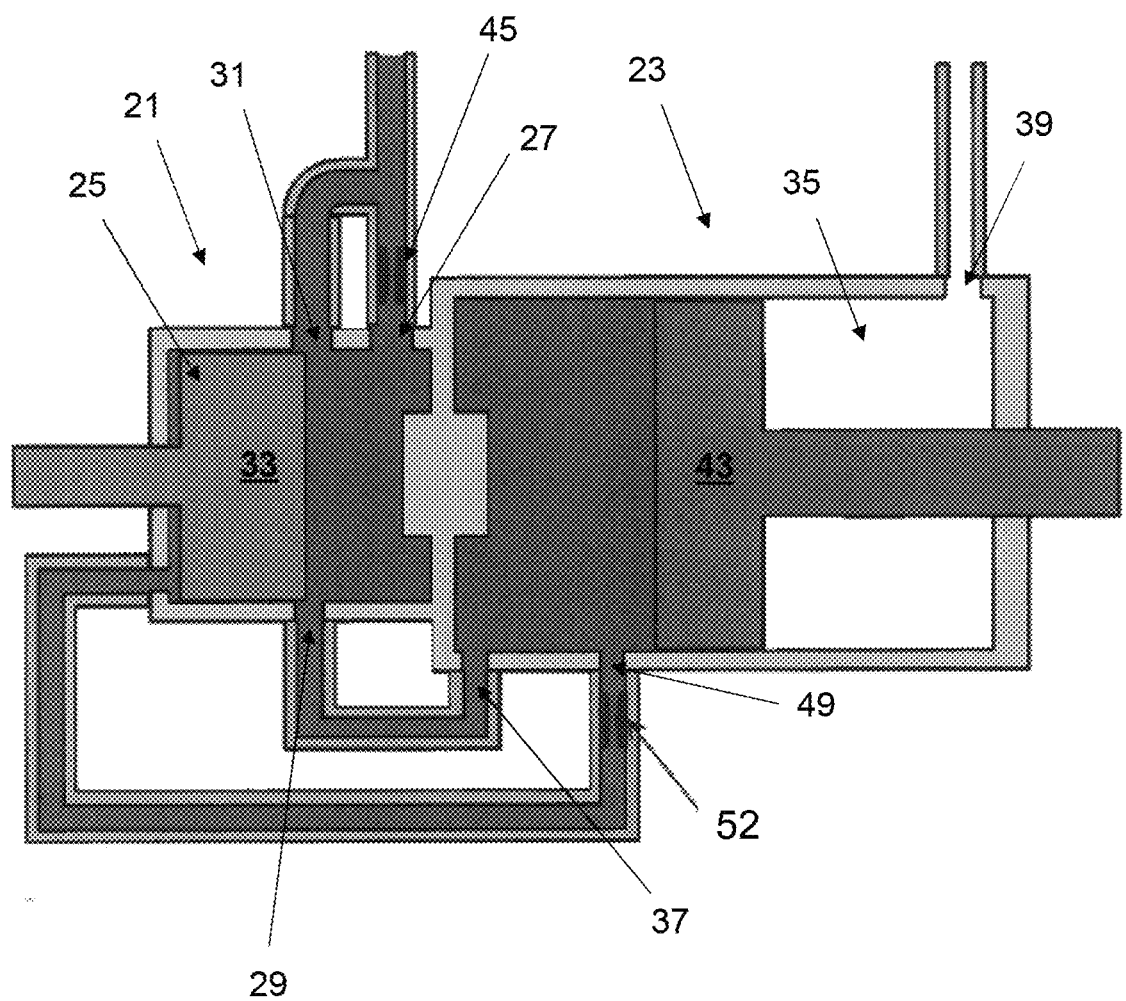

Referring now to FIGS. 3d and 3e the piston 43 begins to be pushed along the chamber 35 by the continuing supply of hydraulic fluid. As the piston continues to move (FIG. 3f) a further port 49 is exposed. The exposure of this port 49 has no effect during folding of the wing tip device (the resulting hydraulic pressure either side of the piston 33 will be equal) but the port 49 is discussed in more detail with respect to the reverse motion (see FIGS. 4a to 4g).

Figure 3G:
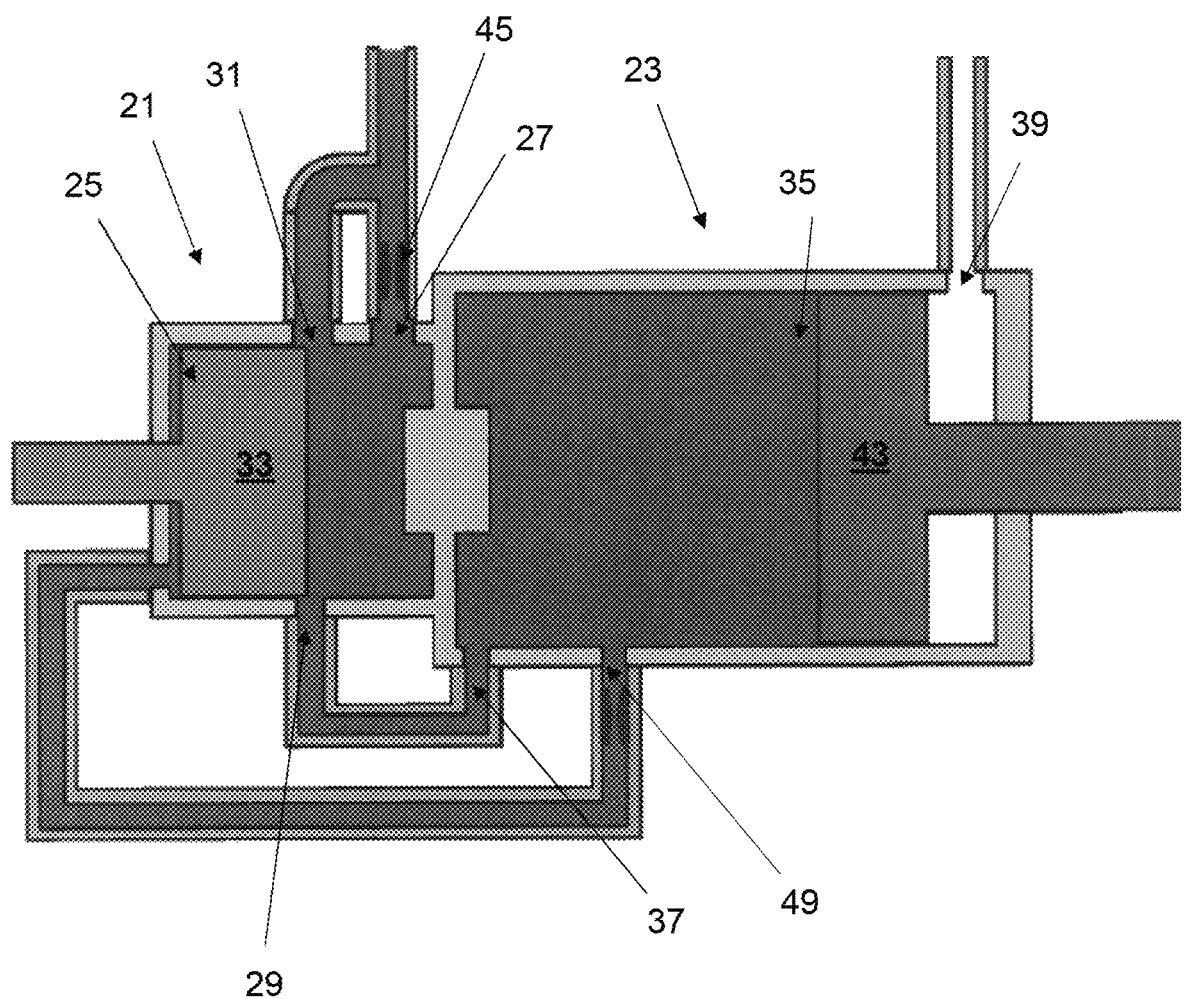
Figure 4A:
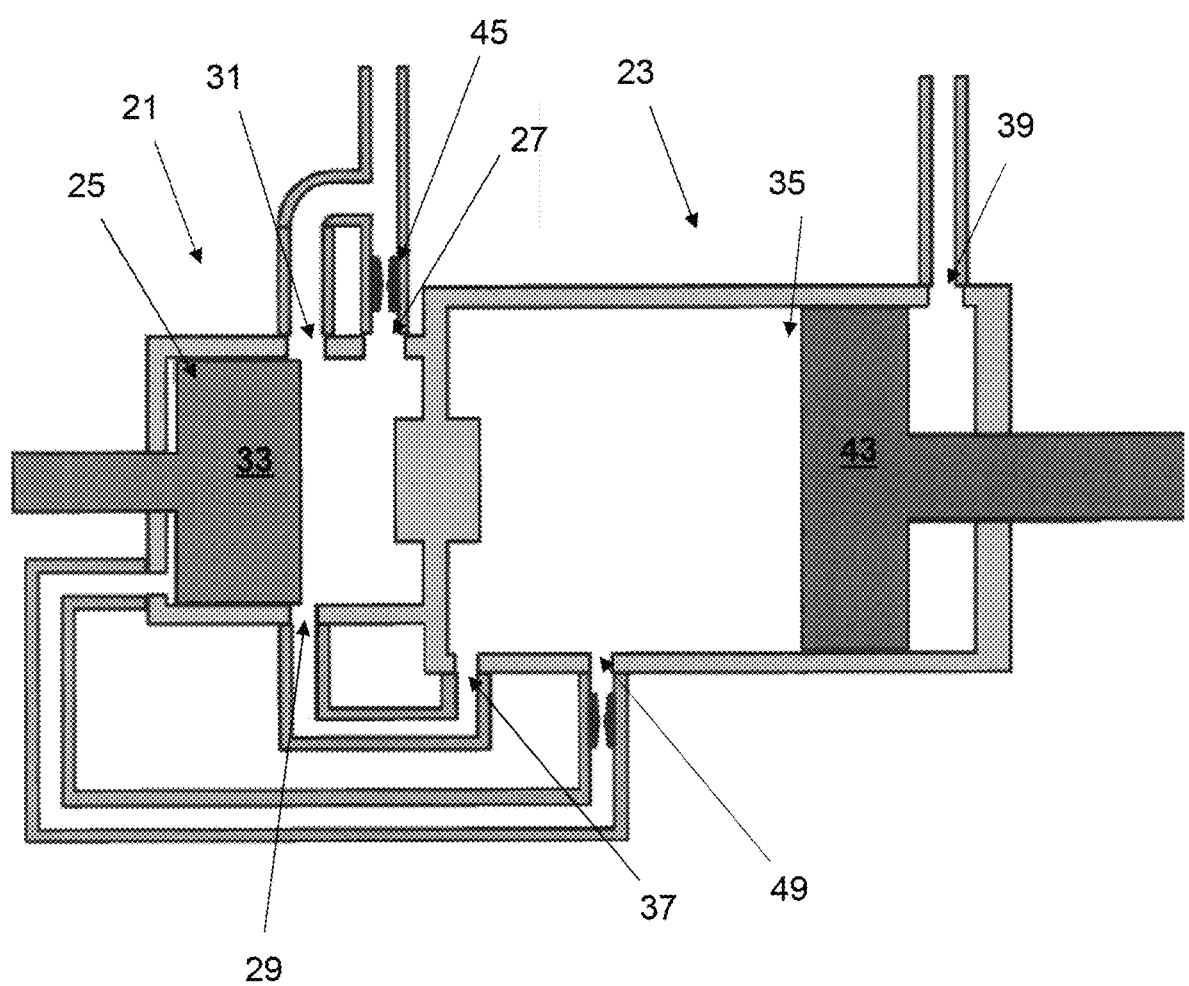
FIGS. 4a to 4g are schematic views of the two-stage actuator of FIG. 1, during the unfolding of the wing tip device and locking of the lock.
Figure 4B:
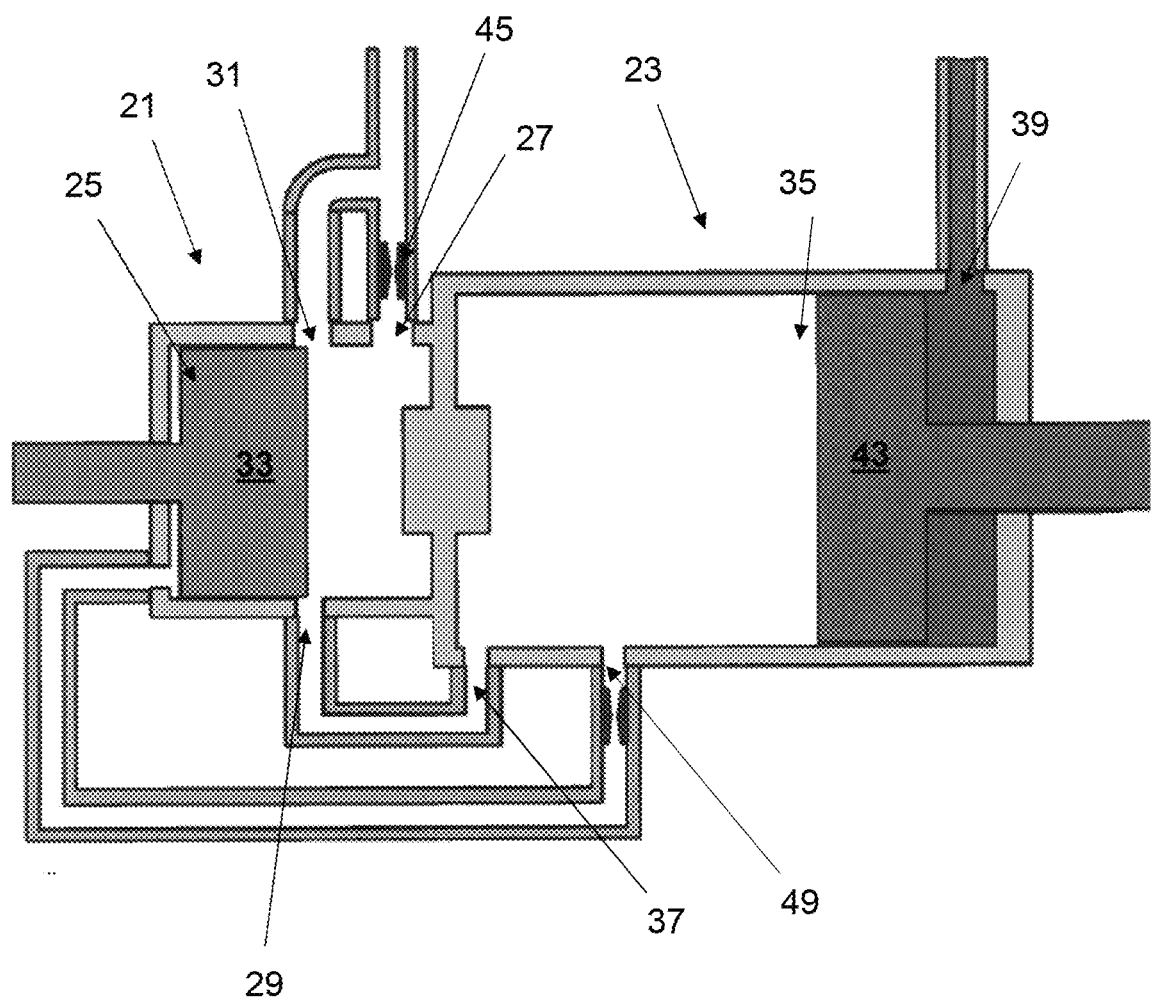
Figure 4C:
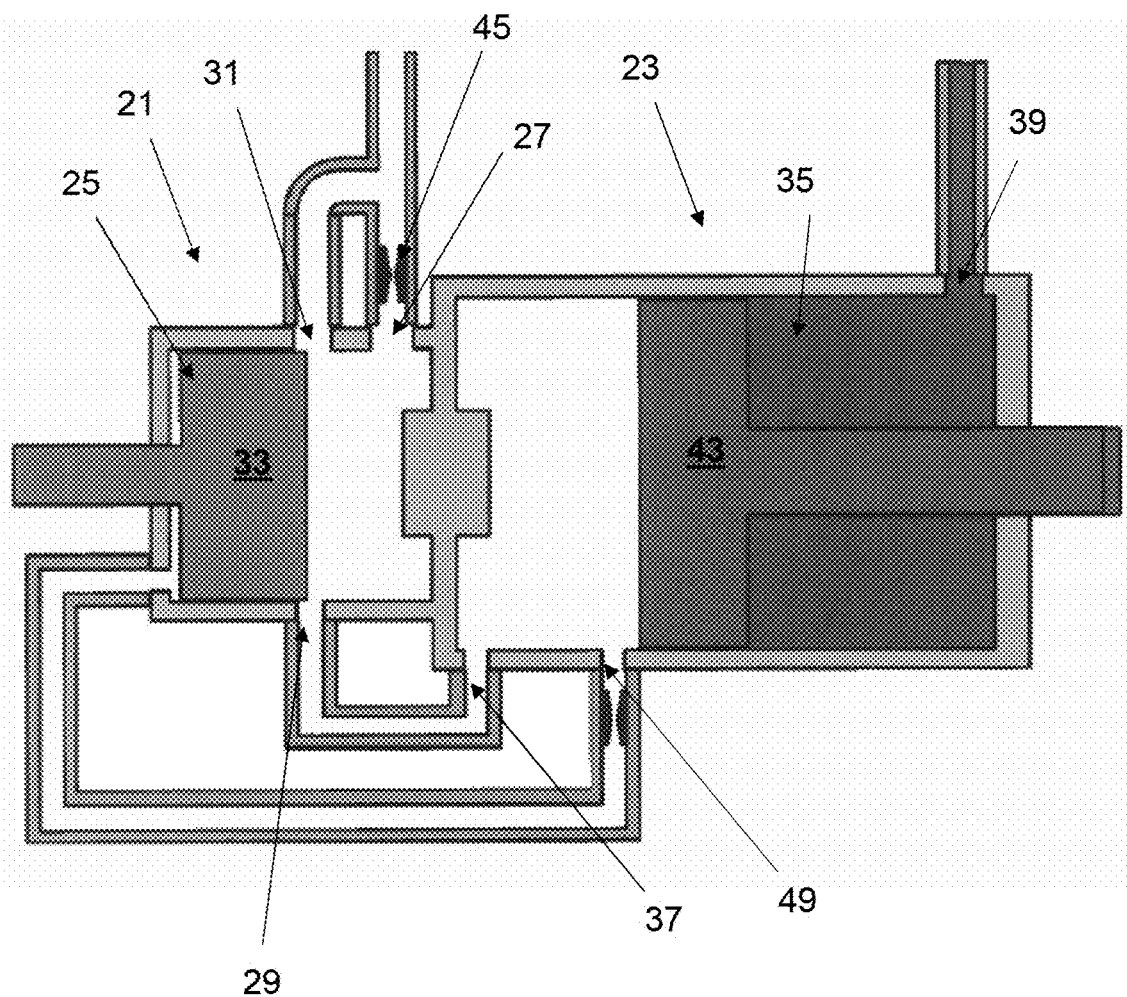
Figure 4D:
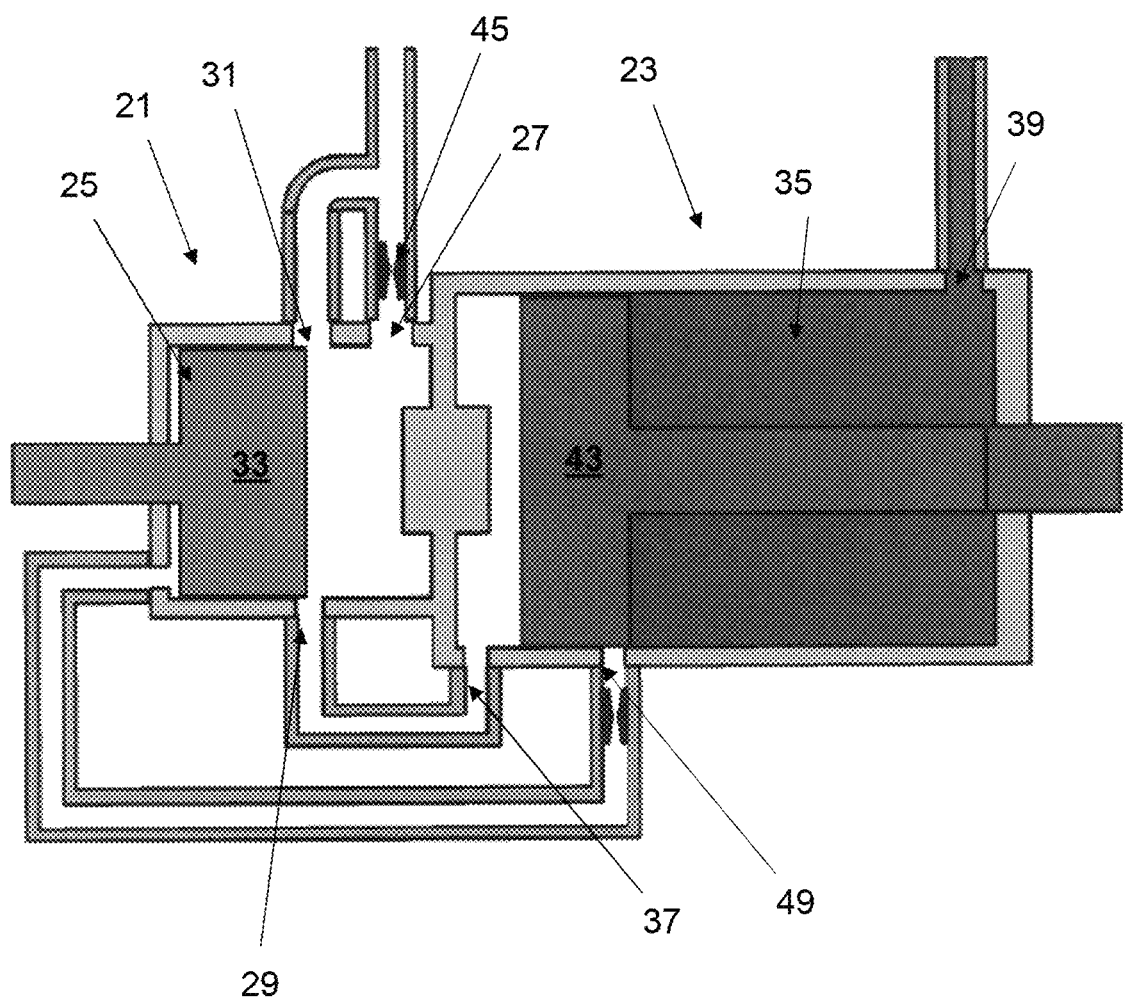
Figure 4E:
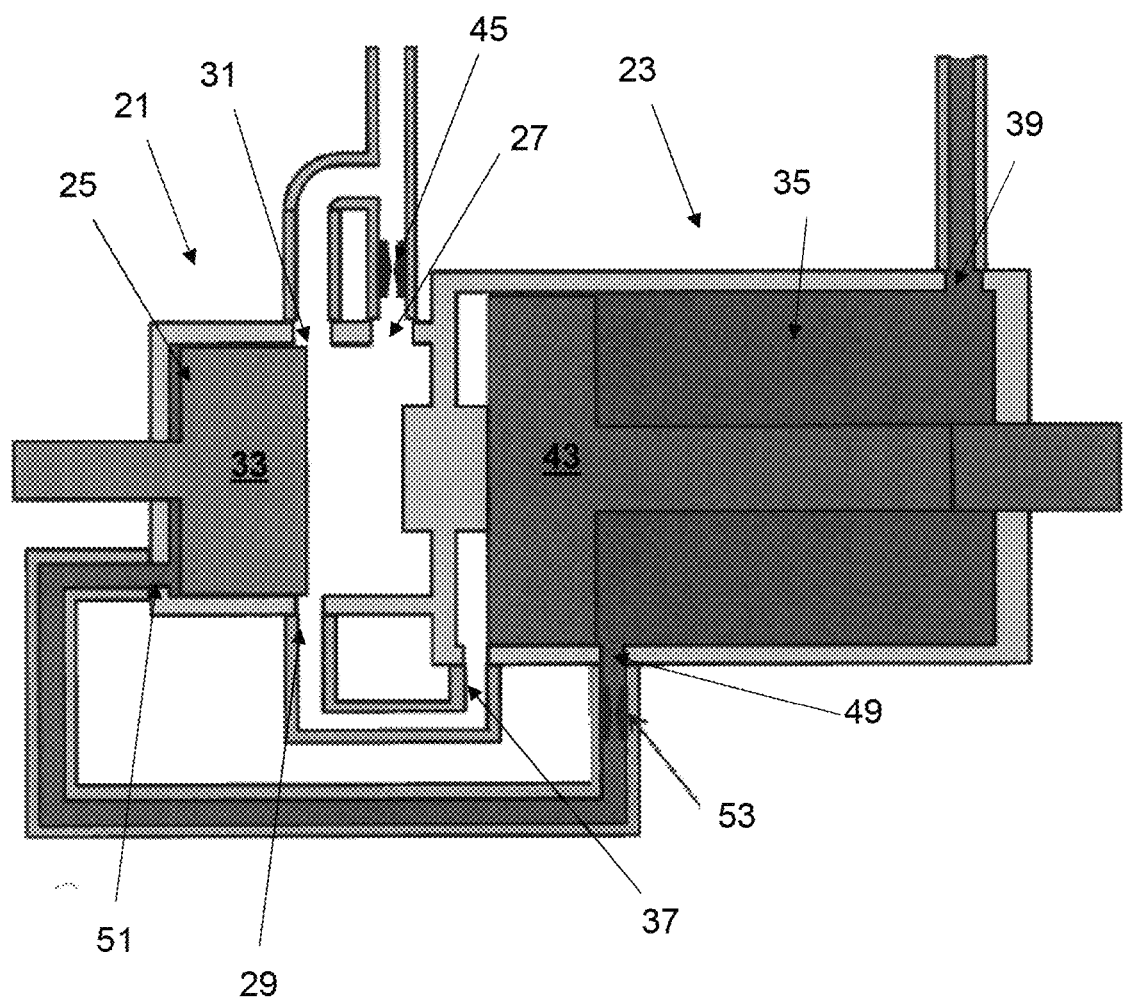
Figure 4F:
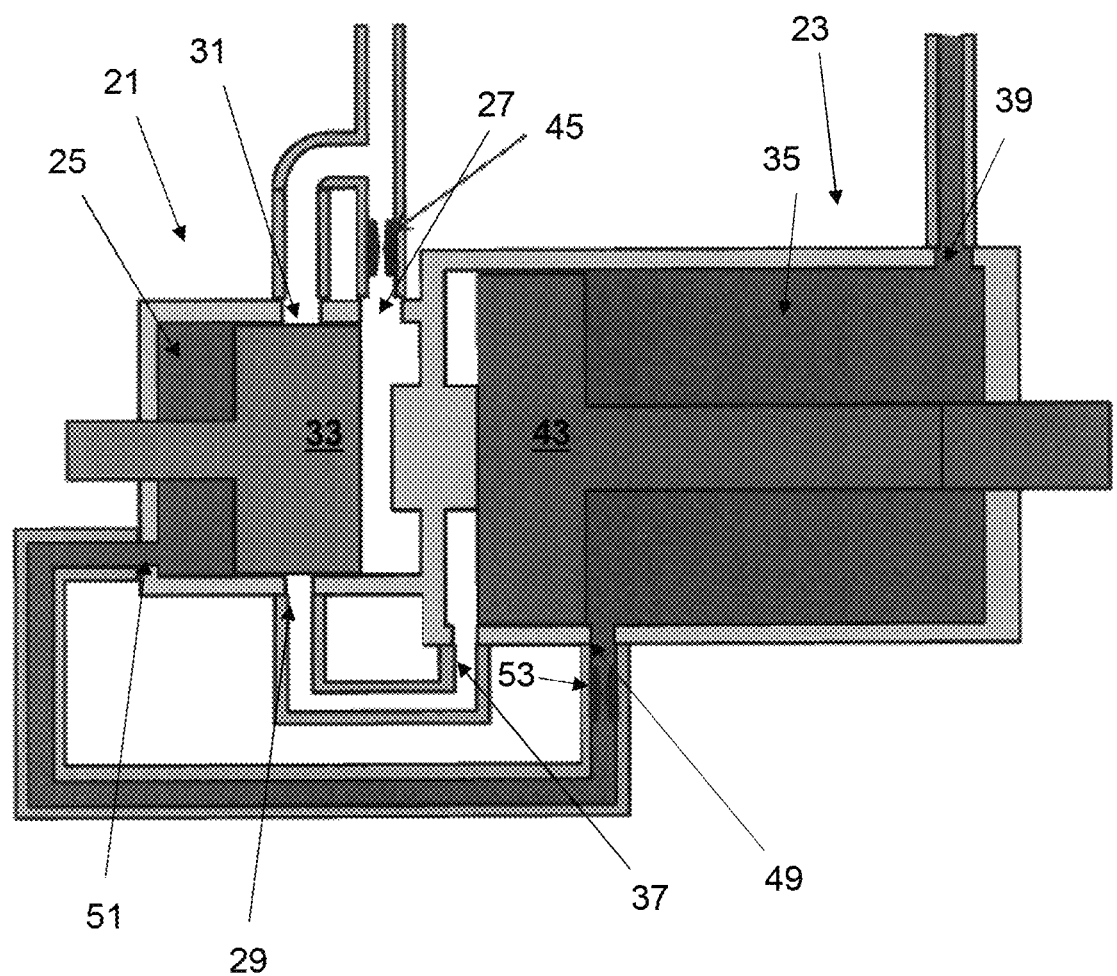
Figure 4G:
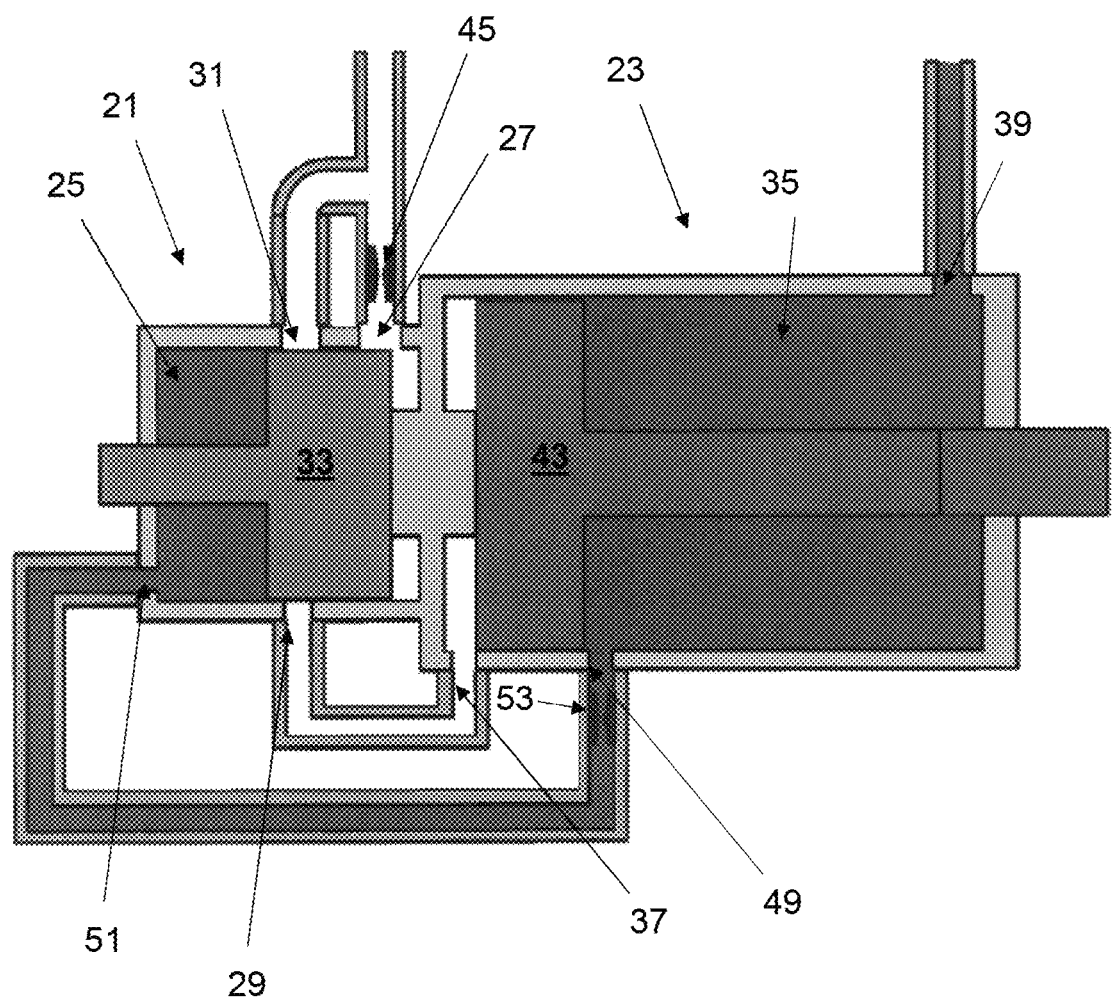

When the piston 43 reaches the position in FIG. 3g the second actuator stage 23 is fully extended. Since the area of the piston 43 in the second actuator stage is larger than the area of the piston 33 in the first actuator stage 21, it exerts a greater force (for a fixed hydraulic pressure). The actuation force is enough to push the wing tip device 1 such that it rotates upwardly about the hinge 9 to reach the ground configuration (the upward rotation is enabled by virtue of the second actuator stage 23 exerting the force on the wing tip device, below the hinge line 9). The ground configuration is not shown in the figures, but occurs when the wing tip device is substantially upright, and such that the span of the aircraft is reduced.

It will be appreciated from the description above that the first and second actuator stages 21, 23 in the first embodiment of the invention are connected in series. Hydraulic fluid is not supplied to the second actuator stage 23 unless or until the first actuator stage 21 has completed unlocking the lock mechanism 13. This ensures that the wing tip device cannot be actuated until the lock has been unlocked. Thus, embodiments of the invention ensure the unlocking and movement of the wing tip device are carried out in the correct sequence.

The two-stage actuator 3 in the first embodiment is also advantageous in performing the reverse movement, as will now be described with reference to FIGS. 4a to 4g.

When the wing tip device is in the ground configuration (FIG. 4a), tank pressure is applied to all ports of the actuator 3. The first and second actuator stages 21, 23 are therefore held in their extended positions. When the wing tip device is to be unfolded, hydraulic fluid is supplied to an inlet port 39 (which acted as the outlet port 39 during the reverse movement)—see FIG. 4b. This acts to push the piston backwards (see FIGS. 4b-d) thereby retracting the second actuator stage and lowering the wing tip device 1.

Once the second actuator stage 23 is fully retracted (see FIG. 4e) the wing tip device is back in the flight configuration. Within the second actuator stage 23, the outlet port 49 is exposed (this port was redundant in the reverse motion). The hydraulic fluid is then able to flow to the inlet 51 of the first actuator stage 21. The second actuator stage 23 comprises a restrictor 53 for controlling this fluid flow back to the first actuator stage 21.

Under the controlled flow to the first actuator stage 21, the piston 33 in the first actuator stage is moved back (see FIGS. 4f and 4g), thereby re-engaging the pin 15 in the hole 17 such that the locking mechanism is locked. During this movement, the bypass port 31 is closed off by the piston 33 (see FIG. 4f), and the restrictor 45 can therefore also be used to control the actuation by regulating the flow out of the chamber 25.

Providing a two-stage actuator 3 with first and second stages 21, 23 arranged in series, ensures that the wing tip device 1 is locked in the flight configuration after it has been actuated to that configuration. This ensures the unfolding movement and locking of the wing tip device are carried out in the correct sequence.

Figure 5:
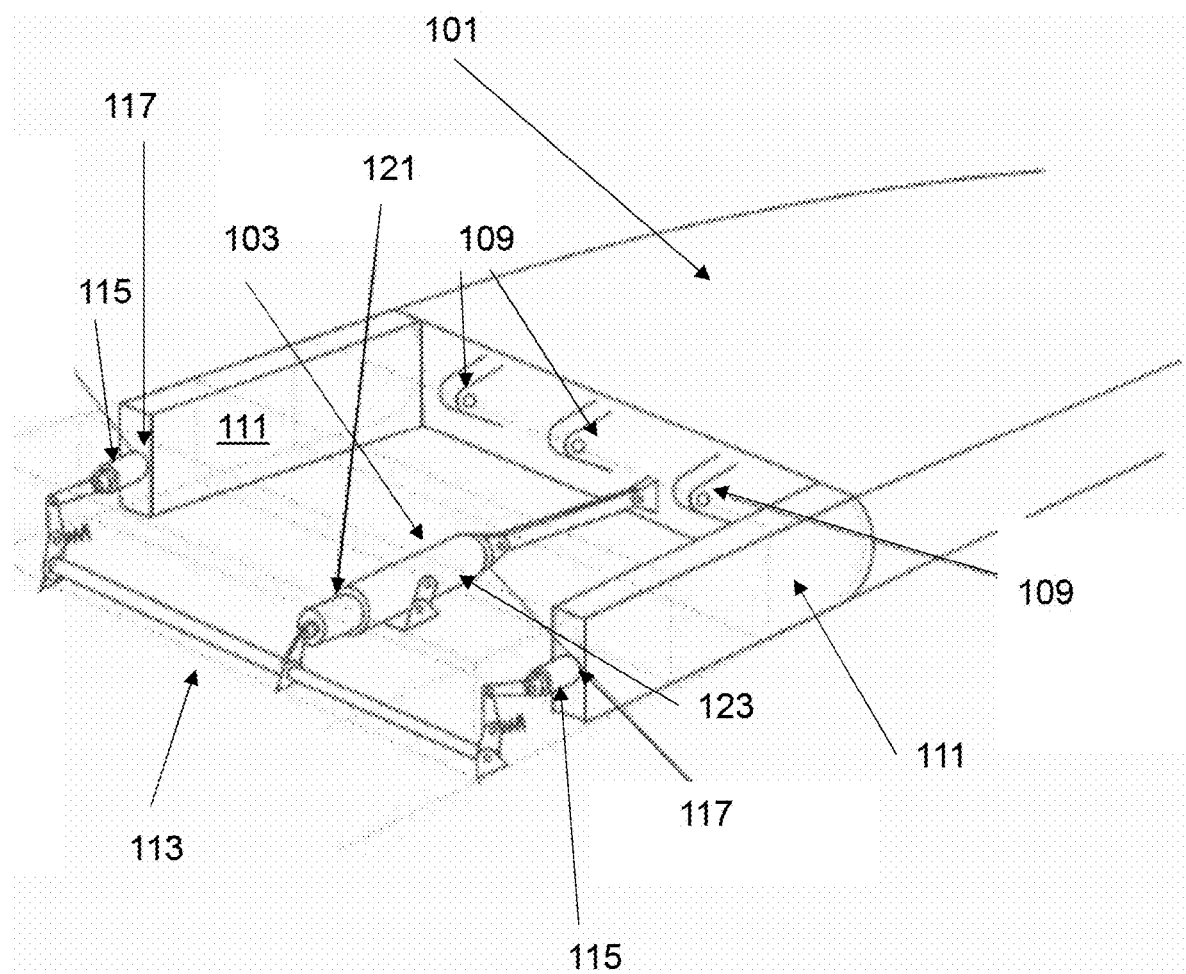
FIG. 5 shows a wing tip device and two-stage actuator on an aircraft according to a second embodiment of the invention.

FIG. 5 shows a wing tip device and two-stage actuator on an aircraft according to a second embodiment of the invention. Features in the second embodiment of the invention that correspond to similar features in the first embodiment of the invention, are shown with the same reference numerals as in the first embodiment, but with the addition of the prefix '1' (or '10' where appropriate). The second embodiment is identical to the first embodiment except that the wing tip device 101 comprises two, spaced apart tangs 111 instead of a stub-spar 11, and the lock mechanism 113 comprises two pins 115 for engaging respective holes 117 in each tang 111. The use of two tangs 111 provides redundancy and therefore a fail-safe arrangement.

Figure 6:
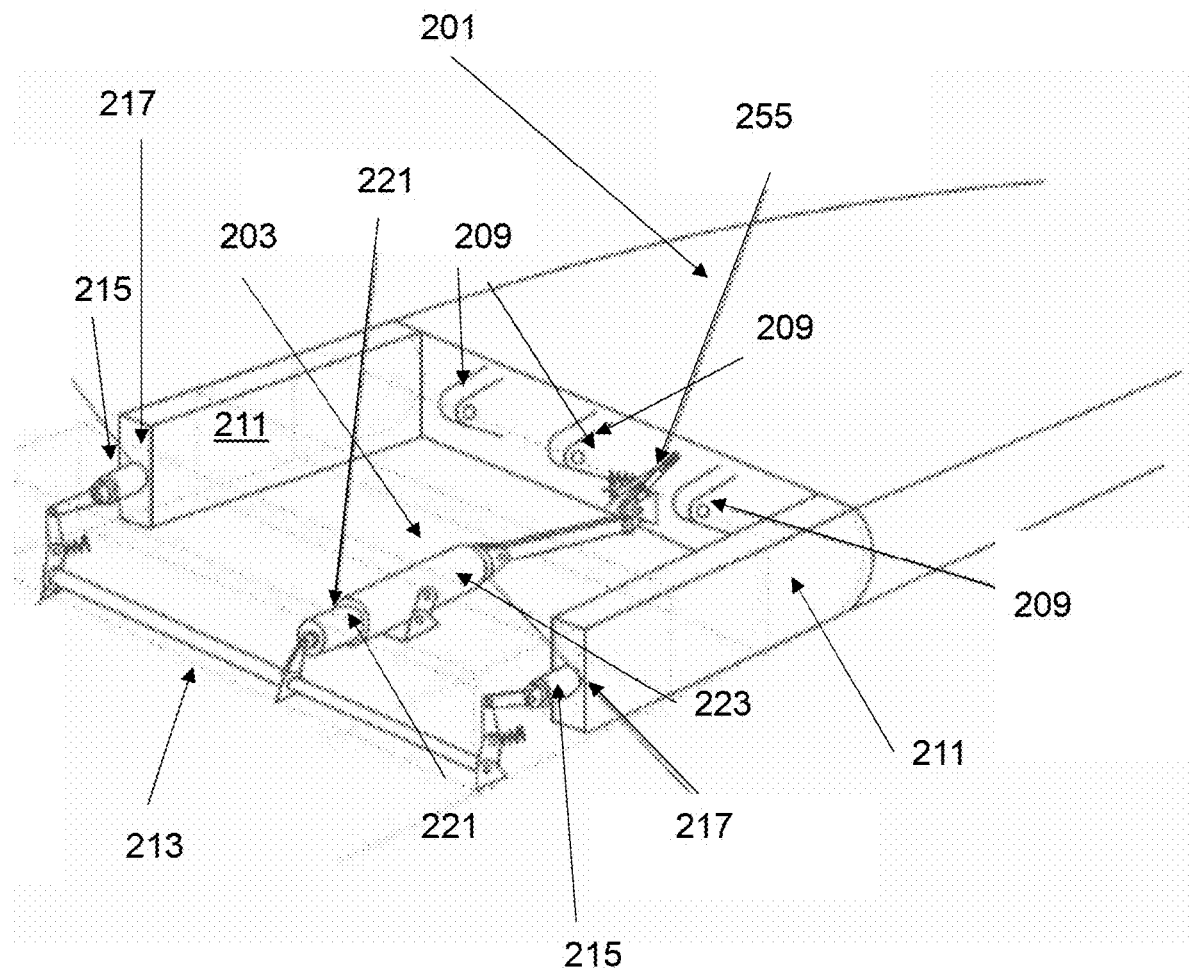
FIG. 6 shows a wing tip device and two-stage actuator on an aircraft according to a third embodiment of the invention.

FIG. 6 shows a wing tip device and two-stage actuator on an aircraft according to a third embodiment of the invention. Features in the third embodiment of the invention that correspond to similar features in the first embodiment of the invention, are shown with the same reference numerals as in the first embodiment, but with the addition of the prefix '2' (or '20' where appropriate). The third embodiment is identical to the second embodiment except that the wing tip device 201 comprises an additional lock 255 in the form of a spring over-centre lock link. This additional lock 255 is unlocked after the lock mechanism 213, by virtue of the second actuator stage 223 extending. It therefore automatically unlocks as the second actuator stage 223 urges the wing tip device 201 towards the ground configuration.

Whilst the present invention has been described and illustrated with reference to particular embodiments, it will be appreciated by those of ordinary skill in the art that the invention lends itself to many different variations not specifically illustrated herein.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention is:

1. An aircraft comprising:
    a wing including a wing tip device at a tip of the wing, wherein the wing tip device is configurable between:
        (i) a flight configuration for use during flight, and
        (ii) a ground configuration for use during ground-based operations, in which ground configuration the wing tip device is moved away from the flight configuration such that the span of the wing is reduced,
    a lock configured to lock the wing tip device in the flight configuration, and
    an actuator configured to unlock the lock and to subsequently actuate the wing tip device from the flight configuration to the ground configuration,
    wherein the actuator is a two-stage hydraulic actuator comprising a first hydraulic actuator stage arranged to unlock the lock and a second hydraulic actuator stage arranged to actuate the wing tip device from the flight configuration to the ground configuration, the first and second hydraulic actuator stages arranged in series such that the second actuator stage is unable to receive a hydraulic input feed until the first actuator stage has been actuated to unlock the lock.

2. The aircraft according to claim 1, wherein the first actuator stage comprises a first hydraulic chamber, an inlet port and an outlet port, and a piston in the first hydraulic chamber, and the second actuator stage comprises a second hydraulic chamber, an inlet port connected to the outlet port of the first actuator stage, and a piston in the second hydraulic chamber, and wherein the two-stage actuator is arranged such that hydraulic fluid is only able to flow through the outlet port of the first actuator stage to the input port of the second actuator stage, once the first actuator stage has unlocked the lock.

3. The aircraft according to claim 2, wherein the first actuator stage comprises a restrictor arranged to control flow of hydraulic fluid into the chamber.

4. The aircraft according to claim 3, wherein the restrictor is associated with the input port of the first actuator stage, and the first actuator stage further comprises a bypass input port arranged to bypass the first input port, once the first actuator stage has unlocked the lock.

5. The aircraft according to claim 2, wherein the piston in the first actuator stage has a first hydraulic area on which the hydraulic fluid acts, and the piston in the second actuator stage has a second hydraulic area on which the hydraulic fluid acts, and wherein the first hydraulic area is smaller than the second hydraulic area, such that second actuator stage is arranged to exert a greater actuation force than the first actuator stage.

6. The aircraft according to claim 1, wherein in the wing tip device is moveable between the flight and ground configurations about a hinge, and in the flight configuration the wing tip device generates a static bending moment about the hinge, and the first actuator stage is arranged to at least partially relieve the static bending moment, prior to unlocking the lock.

7. The aircraft according to claim 6, wherein the static bending moment acts to keep the lock locked, and wherein the first actuator stage is arranged to sufficiently relieve the static bending moment that the wing tip device can be unlocked.

8. The aircraft according to claim 7, wherein the lock comprises a pin received in a hole, and in the locked flight configuration the static bending moment generates a shear load across the pin, and wherein the first actuator stage is arranged to sufficiently relieve the static bending moment such that the shear load on the pin is reduced so that it can be withdrawn from the hole to unlock the lock.

9. An aircraft comprising:
a wing including a wing tip device at a tip of the wing, wherein the wing tip device is configurable between:
(i) a flight configuration for use during flight, and
(ii) a ground configuration for use during ground-based operations, in which ground configuration the wing tip device is moved away from the flight configuration such that the span of the wing is reduced,
a lock configured to lock the wing tip device in the flight configuration, and an actuator configured to actuate the wing tip device from the ground configuration to the flight configuration, and to subsequently lock the lock, wherein the actuator is a two-stage hydraulic actuator comprising a first hydraulic actuator stage arranged to lock the lock and a second hydraulic actuator stage arranged to actuate the wing tip device from the ground configuration to the flight configuration, the first and second hydraulic actuator stages being arranged in series such that the first actuator stage is unable to receive a hydraulic input feed until the second actuator stage has been actuated to move the wing tip device to the flight configuration.

10. The aircraft according to claim 9, wherein the first actuator stage comprises a first hydraulic chamber, a piston in the chamber, and an inlet port, wherein the second actuator stage comprises a second hydraulic chamber, a piston in the second hydraulic chamber, an inlet port, and an outlet port connected to the inlet port of the first actuator, and wherein the two-stage actuator is arranged such that hydraulic fluid only flows through the outlet port of the second actuator stage to the input port of the first actuator stage, once the second actuator stage has moved the wing tip device to the flight configuration.

11. The aircraft according to claim 10, wherein the outlet port of the second actuator stage comprises a restrictor for controlling flow to the input port of the first actuator stage.

12. A method of unlocking a wing tip device and for moving the wing tip device from a flight configuration for use during flight to a ground configuration for use during ground-based operations, in which ground configuration the wing tip device is moved away from the flight configuration such that the span of the wing is reduced, wherein the method comprises:

(i) supplying hydraulic pressure to a first actuator stage to cause the first actuator stage to unlocks a lock that had been locking the wing tip device in the flight configuration, and (ii) subsequently supplying hydraulic pressure, through the first actuator stage, to a second actuator stage that is arranged in series with the first actuator stage, to cause the second actuator stage to move the wing tip device from the flight configuration to the ground configuration.

13. A method of moving a wing tip device from a ground configuration for use during ground-based operations, to a flight configuration for use during flight, in which flight configuration the wing tip device is moved away from the ground configuration such that the span of the wing is increased, wherein the method comprises:

(i) supplying hydraulic pressure to a second actuator stage to cause the second actuator stage to move the wing tip device from the ground configuration to the flight configuration, (ii) subsequently supplying hydraulic pressure, through the second actuator stage, to a first actuator stage that is arranged in series with the second actuator stage, to cause the first actuator stage to lock a lock that locks the wing tip device in the flight configuration.

* * * * *